June 24, 1947.  W. F. KLING  2,422,912
CLOSURE FOR AUTOMOBILE BODIES OF STATION WAGON TYPE
Filed Oct. 16, 1944
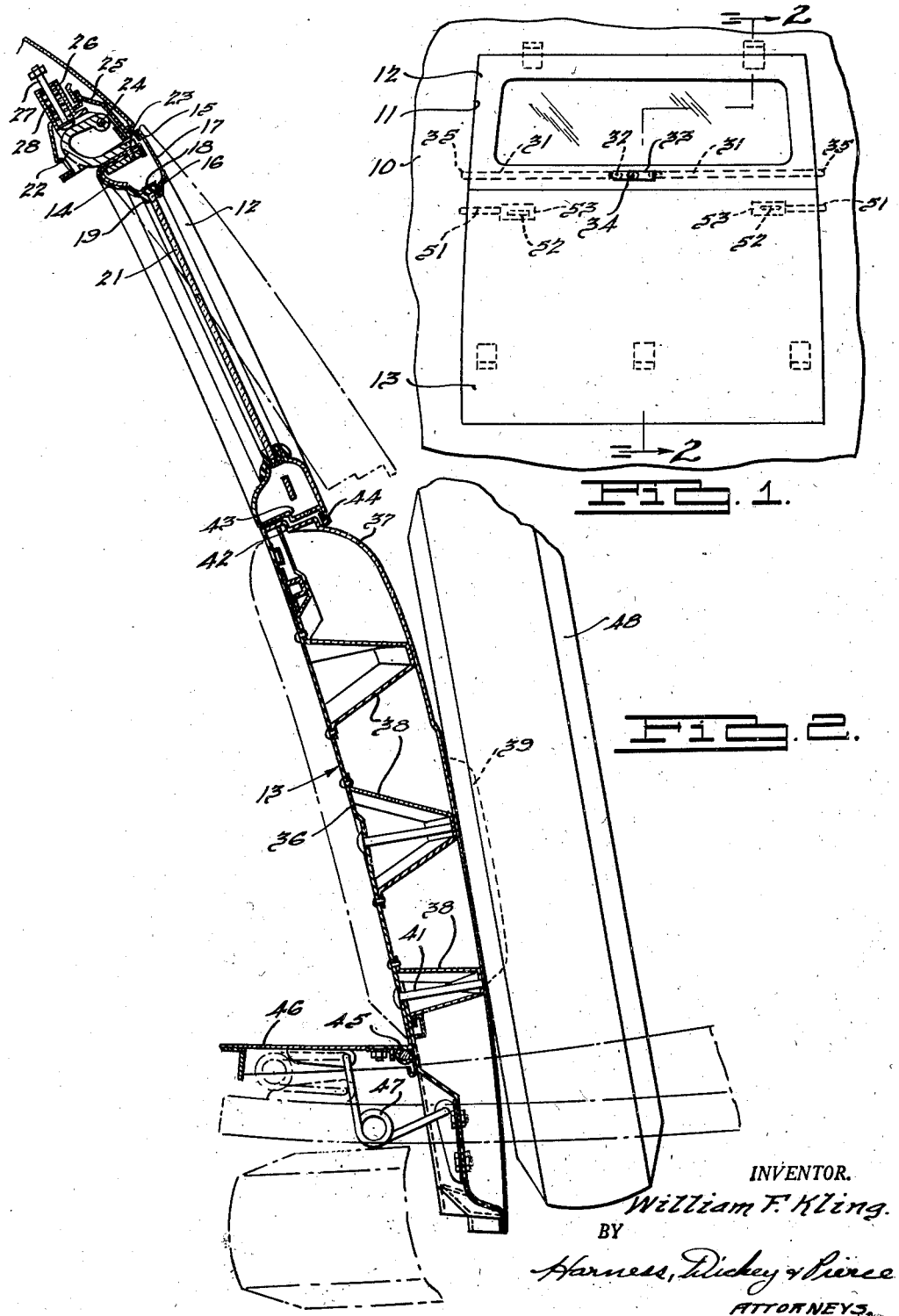
INVENTOR.
William F. Kling.
BY
Harness, Dickey & Pierce
ATTORNEYS Patented June 24, 1947

2,422,912

UNITED STATES PATENT OFFICE 2,422,912

CLOSURE FOR AUTOMOBILE BODIES OF STATION WAGON TYPE

William F. Kling, Detroit, Mich., assignor to The Murray Corporation of America, Detroit, Mich., a corporation of Delaware Application October 16, 1944, Serial No. 558,835

1 Claim. (Cl. 296—44)

This invention relates to automobile bodies, and particularly to closure elements for the rear of the body through which access is had to the interior thereof.

The closure elements of the present invention embody a top and bottom door element hinged respectively at the top and bottom of the door opening, having complementary surfaces which engage each other along the abutting edge when in closed position. The door is employed on the rear of an automobile body and is herein illustrated attached to a body of the type known as a station wagon.

The upper door element has hinges and cooperating springs which swing the door element outwardly when the latch thereof is released. This swings the top door element out of position to permit the bottom door element to be unlatched and swung downwardly to open position without interference and to permit it to be swung to closed position without any danger of pinching the fingers of the operator's hands which might otherwise occur. The lower door element is also provided with a spring to counterbalance its weight and that of a wheel which is supported on the exterior face thereof. It is to be understood that the wheel may be mounted on the interior of the body but the support of the wheel on the door is desirable, as this arrangement provides maximum storage space within the body.

Individual latching elements are mounted at each side of the lower door element for locking it in closed position. A central handle on the lower sill portion of the upper door element operates a pair of latching bars which are moved laterally outward from the side edges of the element into engagement with slots in each side pillar of the body opening. A lock cylinder is mounted within the operating handle for locking the handle against rotation, thereby locking both of the door elements in fixed position to the door frame of the body.

Accordingly, the main objects of this invention are: to provide upper and lower door elements with inter-engaging complementary flanges and rabbets for providing a continuous sealed surface at the joint therebetween; to mount the upper door element on hinges which are spring pressed to move the door element ajar when the latch mechanism of the door is released; to provide a spring on the lower door element to counterbalance the weight of the door and the wheel which is secured thereto; to provide locking means for the upper and lower door elements which securely locks the elements together and to the door frame of the body; and in general to provide a closure element for the rear portion of a vehicle body which is simple in construction, positive of operation, and economical of manufacture.

Other objects and features of novelty of this invention will be specifically pointed out or will become apparent when referring, for a better understanding of the invention, to the following description taken in conjunction with the accompanying drawing, wherein Figure 1 is a broken rear view of an automobile body having rear closure elements therefor embodying features of this invention; and Figure 2 is an enlarged sectional view of the structure illustrated in Fig. 1, taken on the line 2—2 thereof.

In the figures, a vehicle body 10 is illustrated, having a door opening 11 in the rear wall in which an upper door element 12 and a lower door element 13 are mounted. The upper door element 12 is constructed of an inner frame panel 14 of U-shape, provided with outwardly directed flanges 15 and 16 to which the inner and outer edges of the outer frame panel 17 are secured. The outer edge of the panel 17 is reversely bent over the outer flange 15 of the inner panel 14 to provide a reinforced extending flange about the edge of the frame. The mated inter-flanges provide a seat 18 for a glass supporting strip 19 having a channel in which the window glass 21 is secured in a conventional manner.

A pair of U-shaped hinges 22 are secured to the upper reinforced wall of the inner panel 14 by a plurality of screws 23. The upper edge of the hinge is secured on a pintle 24 to a header 25 within the body. A cylindrical casing 26 is mounted in the header above each of the hinges 22 containing a plunger 27 and a spring 28 which urges the plunger downwardly into engagement with the hinge 22 for the purpose of applying a bias thereto for maintaining the entire upper door element in partially open position when the locking element therefor is released.

Within the hollow interior of the lower horizontal portion of the frame panel 14 is mounted a pair of locking bars 31 having their inner ends pivoted to a cross link 32 which is operated to horizontal and vertical position by an exteriorly mounted operating handle 33. A locking cylinder 34 is provided in the handle 33 by which the handle may be secured in locked position when the locking bars 31 are extended laterally to have the ends 35 project into slots in the side pillars of the door opening, not herein illustrated.

The bottom door element 13 is formed from an inner panel 36 and an outer panel 37 which are reinforced by triangular bracing elements 38 in a conventional manner. A wheel supporting bracket 39 is secured to the door by a plurality of bolts 41. The upper edge of the door is provided with a rabbeted portion 42 which is engaged by a rabbeted portion 43 on the lower edge of the upper door panel to provide a seal therebetween in addition to that provided by the overlapped flange 44 about the edge of the upper door element. A pair of hinges 45 secures the lower door element to the rear edge of the floor panel 46, and a pair of jack springs 47 are mounted between the floor panel and the lower door portion for counterbalancing the weight of the door and the wheel 48 which is mounted on the bracket 39. A pair of latching elements 51 is mounted on the door, one on each side edge thereof near the top, operated by a pair of handles 52 mounted in recesses 53 provided in the inner panel 36.

When the lower door element 13 is moved to closed position, the latching elements 51 snap into locked position, and the top door element 12 is then moved into alignment with the bottom door panel against the bias of the springs 28 and the locking handle 33 is turned to horizontal position to move the ends 35 of the latching bars 31 into the slots in the door pillars to secure the upper door panel in latched relation to the rear door panel and the pillars at the door opening. The lock cylinder 34 may then be turned to lock the handle against turning movement, which thereby securely locks both of the door panels in fixed relation to the body.

What is claimed:

In a vehicle body having a door opening in the rear wall defined by side pillars, a header and a floor panel, a closure for said opening embodying an upper window frame and a lower panel element, a flange on the lower edge of said frame overlapping the top edge of said lower panel element, hinges securing the upper edge of the frame to the header, hinge means securing the lower portion of the lower panel element to the floor panel, latch means for securing the lower panel element in closed position, locking means for said frame which also locks said lower panel element in position by means of said overlapping flange, spring means operating on the hinges of said frame for moving said frame ajar when the locking means is released to permit the lower panel to be raised and lowered without interference with the upper window frame, and spring means attached to said lower panel element for counterbalancing the weight of said element.

WILLIAM F. KLING.

REFERENCES CITED

The following references are of record in the file of this patent:

UNITED STATES PATENTS

| Number | Name | Date |
|---|---|---|
| 980,780 | Heydecker | Jan. 3, 1911 |
| 2,145,642 | Ball | Jan. 31, 1939 |
| 2,102,110 | Burkey | Dec. 14, 1937 |
| 2,263,065 | Baldauf | Nov. 18, 1941 |
| 2,333,173 | Gunning | Nov. 2, 1943 |
| 2,353,820 | Eddins | July 18, 1944 |
| 1,918,475 | Lassinsky | July 18, 1933 |
| 1,681,188 | Kupfer | Aug. 21, 1928 |
| 688,750 | Stake | Dec. 10, 1901 |

FOREIGN PATENTS

| Number | Country | Date |
|---|---|---|
| 836,168 | France | Oct. 10, 1938 |